United States Patent [19]

Klein et al.

[11] 4,331,992
[45] May 25, 1982

[54] METHOD AND APPARATUS FOR ELIMINATING CROSSTALK IN MAGNETIC TAPE RECORDERS

[75] Inventors: Karl-Heinz Klein, Wiesbaden-Erbenheim; Reinhard Kutzner, Darmstadt, both of Fed. Rep. of Germany

[73] Assignee: Robert Bosch GmbH, Stuttgart, Fed. Rep. of Germany

[21] Appl. No.: 118,747

[22] Filed: Feb. 5, 1980

[30] Foreign Application Priority Data

Feb. 23, 1979 [DE] Fed. Rep. of Germany ....... 2907097
Nov. 10, 1979 [DE] Fed. Rep. of Germany ....... 2945491

[51] Int. Cl.³ .............................................. G11B 5/20
[52] U.S. Cl. .................................................. 360/124
[58] Field of Search ................................... 360/124, 55

[56] References Cited

U.S. PATENT DOCUMENTS

| | | | |
|---|---|---|---|
| 2,713,676 | 7/1955 | Fleming, Jr. | 360/124 |
| 2,986,608 | 5/1961 | Pettus et al. | 360/124 |
| 3,479,662 | 11/1969 | Bradford et al. | 360/124 |
| 3,683,515 | 8/1972 | Kosaka | 360/124 |
| 4,157,574 | 6/1979 | Stamer | 360/66 |

*Primary Examiner*—Vincent P. Canney
*Attorney, Agent, or Firm*—Frishauf, Holtz, Goodman & Woodward

[57] ABSTRACT

In order to eliminate crosstalk between adjacent playback and recording heads in a multi-track, multi-head magnetic tape recorder or playback apparatus, the invention provides for tapping off part of the recording current and suitably adjusting its amplitude and/or phase to define a correction current which is applied to the playback head of the apparatus. The voltage resulting from the correction current exactly compensates the voltage induced by the stray magnetic field of the recording head. The correction circuit includes frequency-dependent components which account for the frequency dependence of the crosstalk signals.

4 Claims, 5 Drawing Figures

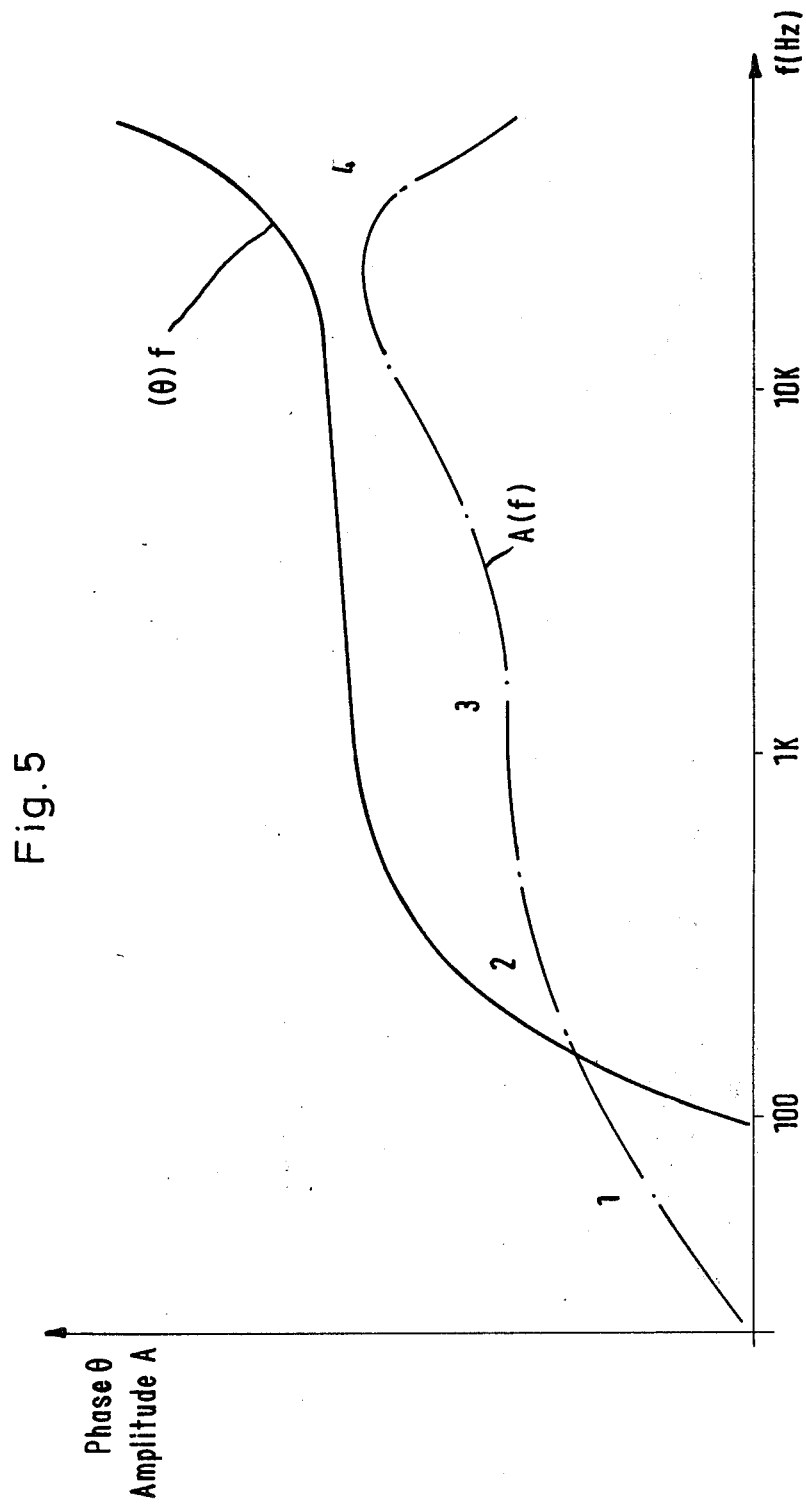

METHOD AND APPARATUS FOR ELIMINATING CROSSTALK IN MAGNETIC TAPE RECORDERS

FIELD OF THE INVENTION

The invention relates generally to magnetic playback and recording equipment. More particularly, the invention relates to multi-track magnetic tape recording equipment in which playback and recording heads are in close physical proximity so that provisions must be made to reduce or eliminate crosstalk between two magnetic heads operating simultaneously.

BACKGROUND OF THE INVENTION AND PRIOR ART

In modern, multi-track magnetic tape recorders, it is sometimes required to operate one magnetic head in a playback mode while another head operates in the recording mode. For example, such simultaneous operation is required when information stored on one magnetic track is to be read-out processed, and re-recorded on another track. During such simultaneous playback and recording, the magnetic stray fields produce a mutual interaction, commonly called "crosstalk" or cross-dubbing, i.e., an interference of the signal, for example, applied to the recording head with the signal being picked up by the head operating in the playback mode. The stray magnetic fields on one of the pickup heads induce a voltage in the other head. For example, the playback signal is adversely affected by voltages induced in the playback head by the stray fields from the recording head.

The general problem of crosstalk in magnetic recording and playback systems is discussed, for example, in "Technik der Magnetspeicher," (*Technology of Magnetic Storage Apparatus*) 2nd edition, 1977, Springer editions, pages 123 and 124. This publication recommends the use of attenuating shields between the magnetic recording and playback heads for reducing crosstalk. Such methods result in maximum attenuation values of approximately 50 dB which still results in the playback amplifying system to begin to oscillate when the spurious signals from the recording head are played back under amplification.

The German Patent Disclosure Document No. 20 52 179 recommends a physical separation of the two magnetic heads in the direction of motion of the magnetic tape. However this remedy is not compatible with fixed standards, for example the SMPTE-1, type B standard, which applies to video and audio recording. Such standards do not permit the occurrence of time delays between different tracks of the same tape in playback and mixing processes.

THE INVENTION

It is thus a principal object of the present invention to provide a method and an associated apparatus for substantially eliminating crosstalk between two physically adjacent magnetic playback/recording heads. It is an associated object of the invention to provide for a method and an apparatus to magnetically decouple two active heads without requiring critical adjustments.

Briefly, according to the invention, a correction current is derived from the current in the recording head and the correction current is applied after suitable processing to the playback head circuit. By applying a processed correction current to the playback circuit, it is possible to introduce therein a correction signal which completely compensates any spurious signal due to induction by the stray magnetic fields of the recording head.

The system and method of the invention has the advantage that the input resistance of the playback amplifier is unaffected. A still further advantage of the invention is that the compensation takes place irrespective of and unaffected by any changes or adjustments in frequency equalizers located either at the recording or playback side of the apparatus.

A particularly advantageous feature of the invention is that the function of the two heads can be reversed without thereby changing the manner of crosstalk compensation. Accordingly, the apparatus required for crosstalk compensation can be particularly simple and may consist of very simple passive networks which can be adapted to provide compensation over the entire frequency domain of the system.

The compensation network remains effective when the function of the transducing heads is reversed without requiring separate switching.

An advantageous feature of the invention is that the compensation network generates a correction signal whose amplitude and phase is dependent on frequency.

THE DRAWING

FIG. 5 is a diagram illustrating the frequency dependence of the compensation network.

DESCRIPTION OF THE PREFERRED EMBODIMENTS

Figure 1:
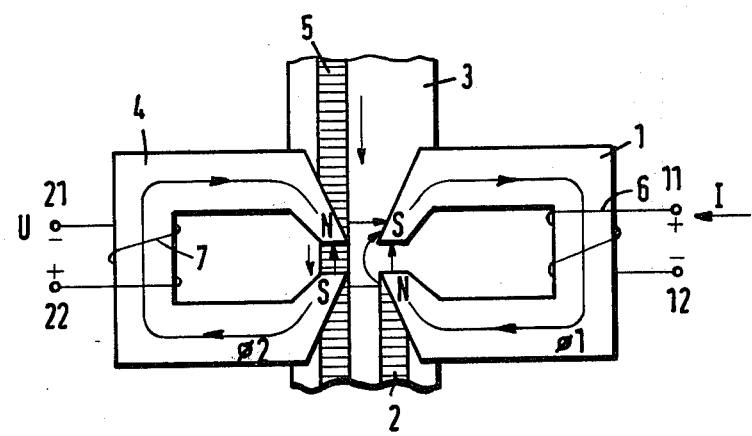
FIG. 1 is a schematic illustration of two neighboring magnetic recording/playback heads of a tape recording apparatus.

A magnetic recording and playback apparatus, for example a multi-track tape recorder, may have a plurality of recording/playback heads, of which two are illustrated in the schematic diagram of FIG. 1. In the diagram of FIG. 1, the two heads under consideration are shown to lie athwart the moving magnetic tape, for the convenience of illustration only. In practice, the two heads would be disposed side-by-side in the direction of motion of the tape. This diagrammatic change, however, does not affect the considerations of the description with respect to the magnetic fields and the voltages induced thereby. Let it be assumed that the magnetic head No. 1, i.e. on the right in the drawing of FIG. 1, is used for recording a signal on track 2 of the magnetic tape 3 moving in the direction of the arrow. At the same time, the recording/playback head 4, i.e., the head in the left part of FIG. 1, is used for playing back a signal contained on track 5.

Simultaneous operation of this type may be necessary, for example, to read signals from one track, mixing these signals with signals contained on another track and thereafter to re-record the processed signals. When the magnetic heads 1 and 4 are operated simultaneously, a closed loop is established between the magnetic head 4, its playback amplifier, the mixing circuit if present, the recording amplifier and the magnetic head 1. If the overall amplification in this spurious loop exceeds unity and if the phase relationships are unfavorable, oscillations may occur in this loop. Such feedback-induced oscillations are extremely undesirable and lead to near total disruption of the orderly playback and recording processes taking place.

Figure 2:
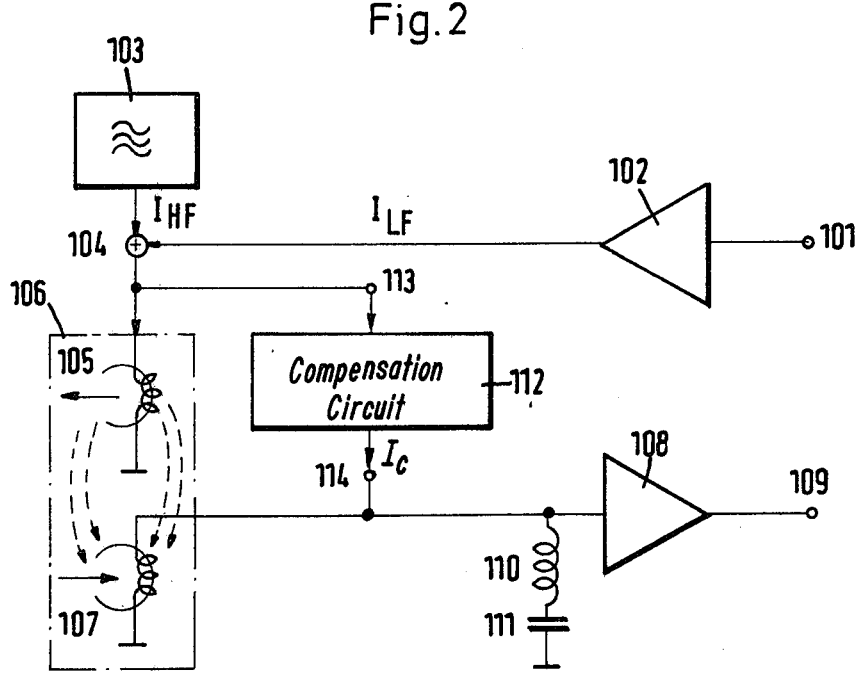
FIG. 2 is a schematic block diagram illustrating the basic features of the invention.

The spurious magnetic communication between the playback heads 1 and 4 is further illustrated in the schematic diagram of FIG. 2. Shown in this diagram is a recording branch which receives a low frequency input signal at the terminal 101 which is amplified in an input amplifier 102. The output of the amplifier 102 is a low frequency current $I_{LF}$ which is proportional to the low frequency input signal at the terminal 101. The low frequency current $I_{LF}$ is added to a high frequency current $I_{HF}$ in an adding circuit 104 of known construction and not otherwise described. The summed currents are applied to the coil of a magnetic head 105 acting as a recording head of a multi-head, multi-track recording system 106 defined schematically by a chain-dotted border. The system 106 further contains a playback head 107. The signal generated in the playback head 107 is fed to a playback amplifier 108 and is available at an output terminal 109. A typical operating frequency of the high frequency generator 103 is, for example, 100 kHz and is used in known manner for pre-magnetization of the recording head 105. A filter circuit consisting of a coil 110 and a capacitor 111 is tuned to the frequency of the high frequency generator 103 and serves to bleed off and remove that signal from the output as will appear.

During the operation of the apparatus, the magnetic field of the recording head 105 extends into the space occupied by the playback head 106 and induces therein spurious voltages. The stray magnetic field of the recording head 105 is shown in FIG. 2 by double dashed arrows. If the function of the two recording heads is reversed, i.e., if the head 105 is used for playback while the magnetic head 107 is used for recording, the crosstalk indicated schematically by the dashed arrows occurs in the opposite sense.

In order to suppress the crosstalk between the two magnetic heads 105, 107, i.e., to sever the coupling between the two heads, the invention provides for the installation of a compensation circuit 112. The input terminal 113 of the circuit 112 receives the same signal as is applied to the input of the recording head 105. The output of the compensation circuit 112 is available at a terminal 114 and is thereafter coupled into the circuit of the coil of the playback head 107. The correction current $I_C$ applied to the playback head circuit generates therein a voltage which provides for self-compensation of voltages induced by the stray magnetic fields from the recording head 105. The correction signal induced in the playback head 107 has the same amplitude but the opposite phase of the spurious signals due to the stray magnetic field. The high-frequency signal from generator 103 is removed by the bleeder circuit 110, 111 tuned to the frequency of generator 103.

The amplitude and phase of crosstalk signals are frequency-dependent due to the existence of recording and playback equalization networks. Furthermore, the crosstalk characteristics change from one magnetic system to another. Accordingly, a suitable compensation circuit would normally take into account the actual measured values of the amplitude and phase of the crosstalk signal between two given magnetic heads. The frequency-dependent relationship of the amplitude A and the phase $\theta$ are illustrated in the two curves shown in the diagram of FIG. 5. These curves are characteristic for two audio heads of a multi-track magnetic video and audio recording and playback system.

Figure 3:
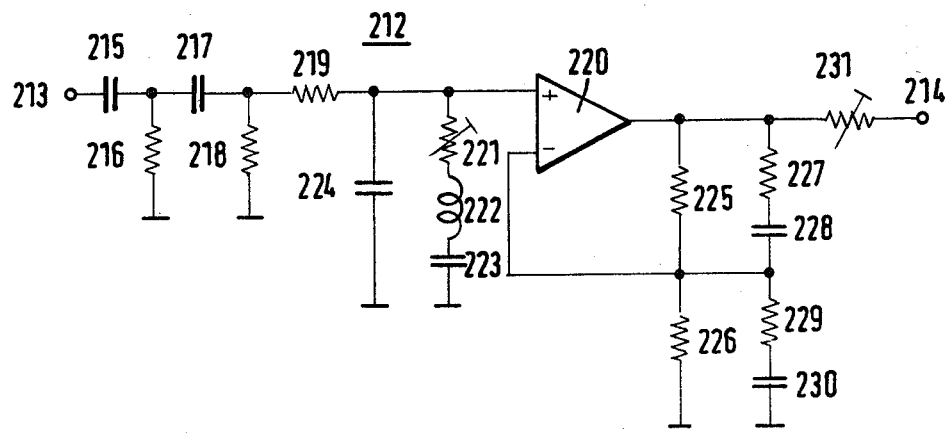
FIG. 3 is a circuit diagram of a compensation network according to the invention.

The detailed construction of one embodiment of a compensation circuit such as the circuit 112 of FIG. 2 according to the invention is illustrated in FIG. 3. The compensation circuit has the overall reference number 212 which relates directly to the compensation circuit 112 of FIG. 2. All other reference numbers which relate to FIG. 2 are increased in FIG. 3 by 100. The signal present at the input 213 of the compensation circuit 212, i.e., the signal derived from the summation point 104 of FIG. 2, passes through two sequential high pass filters composed of R.C. members 215–218. The signal then passes through a decoupling resistor 219 and is applied to the direct input of a differential amplifier 220, connected as a differential amplifier, as well as to a Q-adjustable trap or bleeder circuit 221, 222, 223. Connected in parallel thereto is a capacitor 224. The feedback loop of the operational amplifier, which is connected as a non-inverting amplifier, includes frequency-dependent components 225–230. The output signal from the operational amplifier 220 passes through an adjustable, resistance resistor 231 and is available at the output 214.

The input filters 215, 216 and 217, 218 affect the signal at the contact terminal 213 in regions corresponding to the regions labeled 1 and 2, respectively, in the diagram of FIG. 5. The frequency dependence illustrated in region 3 of FIG. 5 is imposed on the correction signal by means of the R.C. members 229, 230 and the frequency dependence illustrated in region 4 of FIG. 5 is obtained by means of the R.C. members 227, 228. The components 221 and 224 serve to imitate the input impedance of the playback amplifier 108 and its filter circuit 110, 111. As may be seen in FIG. 2, a portion of the correction current $I_C$ flowing into the terminal 114 branches off through the input impedance of the playback amplifier 108 and the filter circuit 110, 111. In order to prevent excessive compensation, this partial branch current flowing into the compensation circuit 112 is subtracted when the correction current is generated. The resistor 221 is a variable trimmer so as to compensate for manufacturing tolerances in the values of the input impedance of the playback amplifier. The circuit illustrated in FIGS. 2 and 3 compensates for both magnetic as well as capacitive crosstalk between the two recording/playback heads.

It has been found in experiments that a relatively wide gauge of usage requires compensation for only magnetic crosstalk. A suitable compensation circuit for this special purpose is illustrated in FIG. 4.

The principal recording current I which flows (FIG. 1) through the coil 6 of the magnetic head 1 generates a magnetic flux $\phi_1$ through the core of the recording head 1. The majority of the magnetic flux passes through the gap of the head 1 but a small portion of the magnetic flux reaches the core of the magnetic head 4. Most of that field flows through the effective gap of the magnetic head 4 but a remanant $\phi_2$ penetrates the coil 7 of the magnetic head 4 and induces therein a voltage U. The induced voltage U has the opposite algebraic sign from the voltage at the coil 6 of the head 1, so that the compensation circuit of FIG. 4 does not have to perform an inversion of signal polarity.

Figure 4:
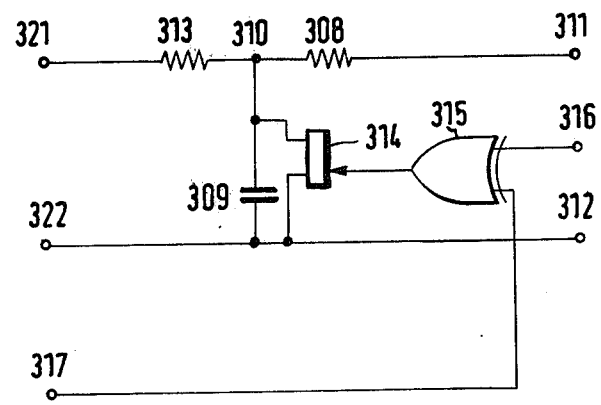
FIG. 4 is a circuit diagram of a simplified special compensation network according to the invention.

The circuit illustrated in FIG. 4 consists principally of a T-filter circuit, the arms of which contain a resistor 308, 313, respectively, and whose leg contains the capacitor 309. The terminal points 321 and 322 are connected to the coil 7 of the playback head 4 FIG. 1 and correspond to the termini 21 and 22 thereof. The corresponding terminals 311 and 312 are connected to the coil 6 of the recording head 1 at points 11, 12 of FIG. 1.

If the magnetic head 1 is used for recording, as has been assumed throughout the description related to FIG. 1, the terminal 11 (311) carries a voltage which is produced by differentiation of the recording current I. This voltage is now integrated by the resistor 308 and the capacitor 309 so that the point 310 of the circuit in FIG. 4 carries a voltage which is proportional to the recording current I. This voltage passes through the resistor 313 to the terminal 21 (321) where it is superimposed on the voltage generated in the playback head. The function of the circuit of FIG. 4 so far described is identically the same if the magnetic head 4 is used for recording while the magnetic head 1 is used for playback.

If both magnetic heads are used for the same function, i.e. both for recording or playback, the compensation circuit is not needed and may be rendered ineffective by switching a field-effect transistor 314 into its conducting state. For this purpose, the gate electrode of the field-effect transistor 314 is connected to a logic gate, as shown, to the output of an exclusive OR gate 315 whose inputs are connected to the normal control lines of a tape recording apparatus that carry signals causing the switchover of the tape recorder from, for example, recording to playback. As shown, the input 316 of the exclusive OR gate 315 may be connected to a control line which switches the magnetic head 1 from recording to playback while the input 317 may be connected to a similar control line for the magnetic head 4 (see FIG. 1). By connecting the exclusive OR gate 315 in this manner, the field-effect transistor 314 is blocked if different status signals are present at the two inputs 316 and 317, thus rendering the compensation circuit effective if one of the magnetic heads is connected for recording while the other is connected for playback.

In a practical embodiment of the circuit of FIG. 4, suitable dimensions of the components were as follows. The resistors 308 and 313 each had a value of 100 kilo-ohms and the capacitor 309 had a value of 1 nF.

The foregoing description of preferred exemplary embodiments of the invention is understood to be subject to modifications and variations within the competence of the person skilled in the art without departing from its scope.

We claim:

1. An apparatus for compensating crosstalk between a recording head (105) and a playback head (107) of a multi-track, multi-head magnetic tape recording and playback system, said system including
   a recording head (105) and a playback head (107);
   a frequency-dependent compensation circuit (112) having a plurality of R.C.-members for generating a correction current of specified amplitude and phase,
   said correction current being applied to said playback head (107) to generate therein a correction voltage which compensates a spurious voltage induced by the stray magnetic field from said recording head (105);
   and wherein said compensation circuit includes a non-inverting amplifier (220) with frequency-dependent feedback elements (225–230), the input of said amplifier (220) being connected to two series-connected high-pass filters (215, 216, and 217, 218) and the output of said amplifier (220) being connected to a high impedance resistor (231) for delivering said correction current ($I_C$).

2. An apparatus according to claim 1, wherein the non-inverting input of said amplifier (220) is connected to a Q-adjustable circuit (221,222,223) having in parallel thereto a capacitor (224) and wherein there is further provided a decoupling resistor (219) between said non-inverting input and said high-pass filter (217,218).

3. An apparatus for compensating crosstalk between a recording head (105) and a playback head (107) of a multi-track, multi-head magnetic tape recording and playback system, said system including
   a recording head (105) and a playback head (107);
   a frequency-dependent compensation circuit (112) having a plurality of R.C.-members for generating a correction current of specified amplitude and phase,
   said correction current being applied to said playback head (107) to generate therein a correction voltage which compensates a spurious voltage induced by the stray magnetic field from said recording head (105);
   and wherein said compensation circuit comprises
   a T-circuit, the arms of which include a respective resistor (308, 313) and said arms being connected between one input terminal and one output terminal of said compensation circuit,
   and a capacitor (309) located in the leg of said T and connected across and to a line connecting the other input terminal to the other output terminal of said compensation circuit.

4. An apparatus according to claim 3, further comprising electronic switch means (314) for selectively shorting said capacitor (309) and a logic gate for controlling the operation of said electronic switch (314).

* * * * *